(12) United States Patent
Specht

(10) Patent No.: US 6,394,495 B1
(45) Date of Patent: May 28, 2002

(54) SEAT BELT TIGHTENER

(75) Inventor: Martin Specht, Feldafing (DE)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 09/803,310

(22) Filed: Mar. 9, 2001

(30) Foreign Application Priority Data

Jun. 13, 2000 (DE) .......................... 100 29 061

(51) Int. Cl.[7] .................... B60R 21/01; B60R 22/195
(52) U.S. Cl. ...................... 280/806; 180/268; 701/45
(58) Field of Search .................... 180/268; 280/806, 280/807; 701/45, 47, 59

(56) References Cited

U.S. PATENT DOCUMENTS

| | | | | |
|---|---|---|---|---|
| 5,552,986 A | | 9/1996 | Omura et al. ............ | 364/424.05 |
| 5,558,370 A | * | 9/1996 | Behr ........................... | 242/374 |
| 5,605,202 A | * | 2/1997 | Dixon ......................... | 180/268 |
| 5,765,774 A | * | 6/1998 | Maekawa et al. ........... | 180/268 |
| 5,788,281 A | * | 8/1998 | Yanagi et al. ............... | 180/282 |
| 5,821,860 A | | 10/1998 | Yokoyama et al. ......... | 340/576 |
| 6,031,484 A | * | 2/2000 | Bullinger et al. ........... | 340/436 |
| 6,038,495 A | | 3/2000 | Schiffmann .................. | 701/1 |
| 6,213,512 B1 | * | 4/2001 | Swann et al. ............... | 180/271 |

FOREIGN PATENT DOCUMENTS

| | | |
|---|---|---|
| DE | 3737554 | 5/1989 |
| DE | 4411184 | 10/1994 |
| DE | 19515055 | 5/1996 |
| DE | 19520721 | 12/1996 |
| DE | 19720626 | 12/1997 |
| DE | 19515055 | 5/1998 |
| DE | 19724876 | 12/1998 |
| DE | 19749857 | 5/1999 |
| DE | 19811865 | 9/1999 |
| EP | 0893313 | 1/1999 |
| GB | 2330935 | 5/1999 |

OTHER PUBLICATIONS

XP-002137509 Section 5—Occupant Protection Advanced Technology.

* cited by examiner

Primary Examiner—Avraham Lerner
(74) Attorney, Agent, or Firm—Lonnie Drayer; Jarett Rieger

(57) ABSTRACT

A seat belt tightener has an electrical tightening drive that can be operated in dependence on sensor signals of sensors assessed in an evaluating device. The sensors detect specific vehicle dynamic conditions and transmit electrical indicating signals that are proportional to the detected condition to the evaluating device. The evaluation device compares the signals with allocated threshold values to determine whether or not a potential crash situation is present. Should a potential crash situation be present, the electrical tightening drive is controlled accordingly.

14 Claims, 2 Drawing Sheets

SEAT BELT TIGHTENER

FIELD OF THE INVENTION

The present invention relates to a seat belt tightener having an electrical tightening drive.

DISCUSSION OF PRIOR ART

DE 195 20 721 A1 teaches a vehicle occupant restraint device with an information system, for instance a pre-crash sensor, used to anticipate a crash prior to any deformation occurring to the motor vehicle and to emit a corresponding signal. This should result in pulling forces passing into a seat belt by an electromotive tightening drive prior to the actual crash. The length of the seat belt extracted can be measured by a sensor to generate an optimal pulling force for tightening the seat belt. This enables the vehicle occupant to already be placed in an optimal position preceding an actual crash, for instance during emergency braking. The known vehicle occupant restraint system evaluates signals that are detected by pre-crash sensors immediately before a crash.

EP 0893313 A2 teaches a vehicle occupant restraint device with a seat belt which, with the help of an electromotive drive, can carry out various optional functions, such as reducing the force of the motive spring when a belt is fastened, adjusting the belt force limitation and the seat belt tightening.

It is known from DE 195 15 055 A1 that, to control the driving stability of a motor vehicle, a set value for a controlled variable, in particular the yaw angle speed, is determined from a motor vehicle model imitating motor vehicle characteristics, and the motor vehicle model is modified in relation to the driving speed.

SUMMARY OF THE INVENTION

In the present invention has an array of sensors used to detect specific vehicle dynamic conditions and the respective sensors generate indicating signals that are proportional to the detected condition and the signals are transmitted to an evaluating device. From the received signals, the evaluating device can detect a potential crash situation and, above a determined vehicle speed threshold, for instance 30 km/hour, the evaluating device controls the electrical seat belt tightening drive, if a potential crash situation was detected from the electrical indicating signals.

It is preferred that indicating signals consist of signals that reflect the operating performance of a motor vehicle. Such indicating signals are traditionally used for the control of vehicle stability (DE 195 15 055 A1).

DETAILED DESCRIPTION OF THE EMBODIMENT

Figure 1:
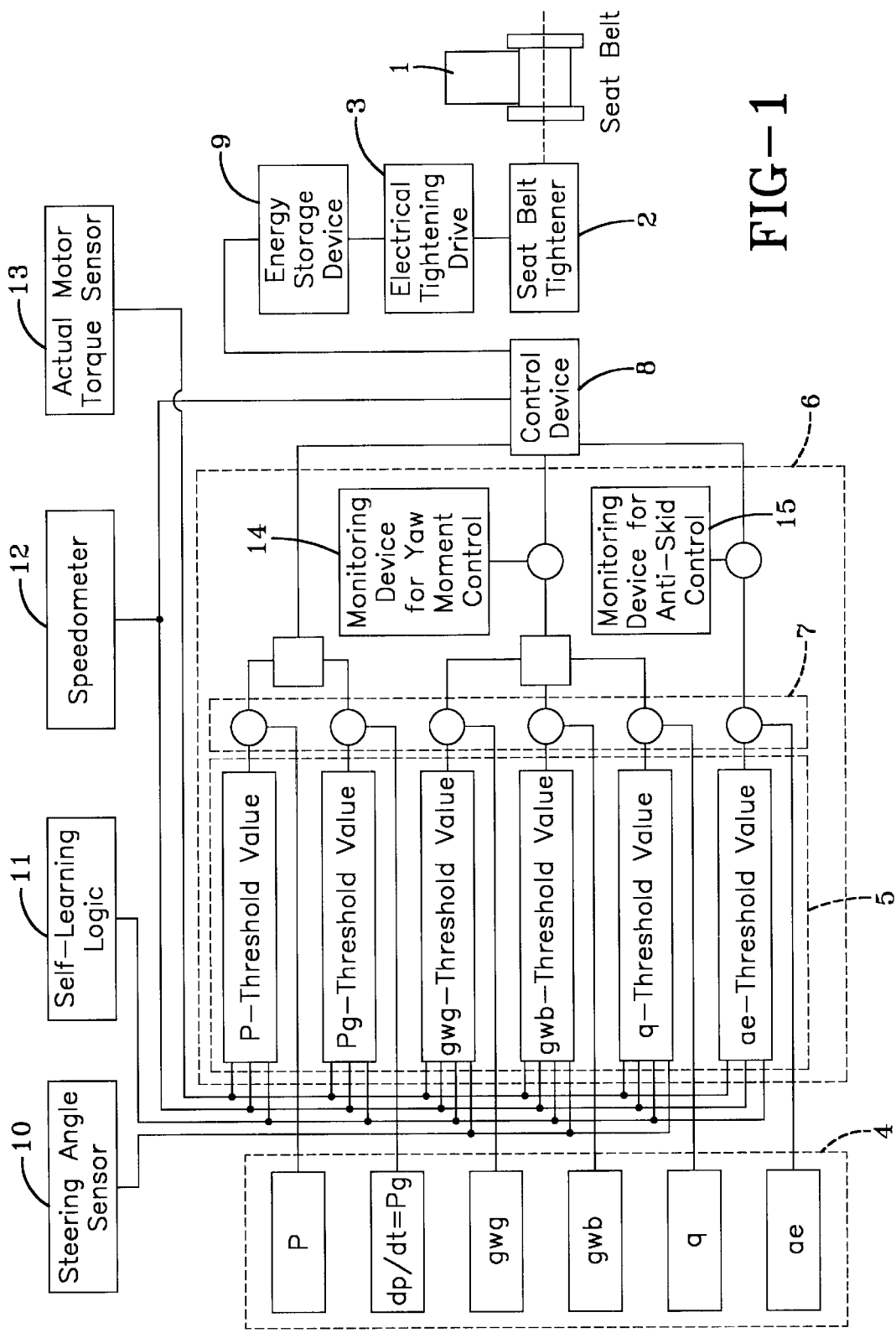
FIG. 1 is a block diagram of an embodiment of the invention.

The embodiment of the vehicle occupant restraint device according to the invention shown schematically in FIG. 1 comprises a seat belt 1 that is configured in a known manner as a three-point seat belt. In addition, the represented vehicle occupant restraint device comprises a seat belt tightener 2 that includes an electrical tightening drive 3. The electrical tightening drive can be an electric motor. An energy storage device 9 supplies energy to the electrical tightening drive 3. The activation of the electrical tightening drive occurs in dependence on the output signals of a control device 8. The control device receives the output of an evaluating device 6 that assesses indicating signals that are generated by various sensors of an array of sensors 4. The electrical indicating signals generated by the array of sensors 4 are proportional to the respective vehicle dynamic driving conditions, which are detected or measured by the various sensors of the array of sensors during the operation of the vehicle.

During vehicle operation the electrical indicating signals are constantly being assessed in the evaluating device 6 with reference to a potential crash situation. For this purpose, the evaluating device 6 comprises a threshold value memory 5, in which various threshold values allocated to various vehicle dynamic operating conditions are stored. These threshold values are compared in a comparison unit 7 with the corresponding indicating signals that indicate the dynamic conditions. In dependence on the comparison results, the evaluating device 6 determines if a potential crash situation exists. If a potential crash situation is determined to exist, the control device transmits a corresponding signal to the energy storage device 9, when the speed of the vehicle exceeds a specific value, for instance 30 km/hour. A speedometer 12 of the motor vehicle transmits a corresponding electrical signal to the control device 8. The control device transmits an the energy releasing signal to the energy storage device 9 only when a corresponding release signal generated by the speedometer 12 indicates the vehicle speed exceeds the threshold value.

In the represented embodiment the vehicle dynamic conditions are registered by the sensors provided in the array of sensors 4. It is preferable that the array of sensors comprises sensors that are used to control the vehicle stability of motor vehicles, in particular for anti-skid control (ABS) and yaw moment control (GMR). The assessment of the existence a potential crash situation can be made via different parallel decision channels, which will be described in more detail.

A first decision channel comprises a brake pressure meter that assesses the brake pressure generated by the vehicle brake pedal. Alternatively, the pedal path or the pedal force can be measured. A corresponding electrical indicating signal p is compared in the comparison unit 7 with an assigned p threshold value. In addition, inside or outside the array of sensors, a computer can calculate the dp/dt brake pressure gradient and a corresponding indicating signal pg can be compared with an assigned pg threshold value. To detect a potential crash situation, the comparison result for the brake pressure gradient can be used alone. To select values of the brake pressure gradient pg which exceed the pg threshold for a short time, however, the comparison result can be linked to the comparison result for the brake pressure p. If the brake pressure exceeds the assigned p threshold value for a particular period of time for instance about 2 milliseconds, with a simultaneous brake pressure gradient above the pg threshold, a potential crash situation is present, so that above a certain minimum vehicle speed, for instance above 30 km/hour, the control device 8 releases energy from the energy storage device 9 for the electrical tightening drive 3.

In a second decision channel, vehicle dynamic conditions, such as yaw angle speed (gwg), yaw angle acceleration (gwb) and lateral acceleration (lateral force) q are measured and corresponding indicating signals are supplied to the evaluating device 6. In said evaluating device a comparison takes places with assigned threshold values in the manner described above. If the comparison result indicates that one of the vehicle dynamic conditions lies above the stored assigned threshold, the evaluating device 6 assesses this as a potential crash situation and activates the control device 8 accordingly. The comparison results for the vehicle dynamic conditions of yaw angle speed, yaw angle acceleration and lateral acceleration can, in the case of a monitoring device 14 determining a simultaneous yaw moment control, be linked to the latter. If, during a specific period of time of the yaw moment control, e.g. 2 to 4 milliseconds, the comparison result generates indicating signals that are higher in value than the assigned threshold values, the evaluating device 6 decides that a potential crash situation is present.

In a third decision channel, longitudinal acceleration or longitudinal brake values can be taken into account. A corresponding indicating signal ae is generated by the array of sensors 4. This vehicle dynamic condition can also be measured during anti-skid control (ABS). The comparison result with a corresponding stored ae threshold value can be assessed for the decision of whether a potential crash situation is present or not. This comparison result can also be linked to information of a monitoring device 15, which indicates whether or not anti-skid control (ABS) is carried out. A potential crash situation can then be determined when the value of the ae indicating signal exceeds the ae threshold value for a specific period of time during the anti-skid control.

To set the threshold values, the corresponding storage allocations of the threshold value storage device 5 can be linked to a self-learning logic 11. Depending on the braking and acceleration activity of particular drivers, threshold values can be adjusted in accordance with self-learning logic. In addition, the threshold values can be adjusted in the evaluating device in dependence on the driving speed. This results in an adjustment to the driving behaviour of a driver.

Figure 2:
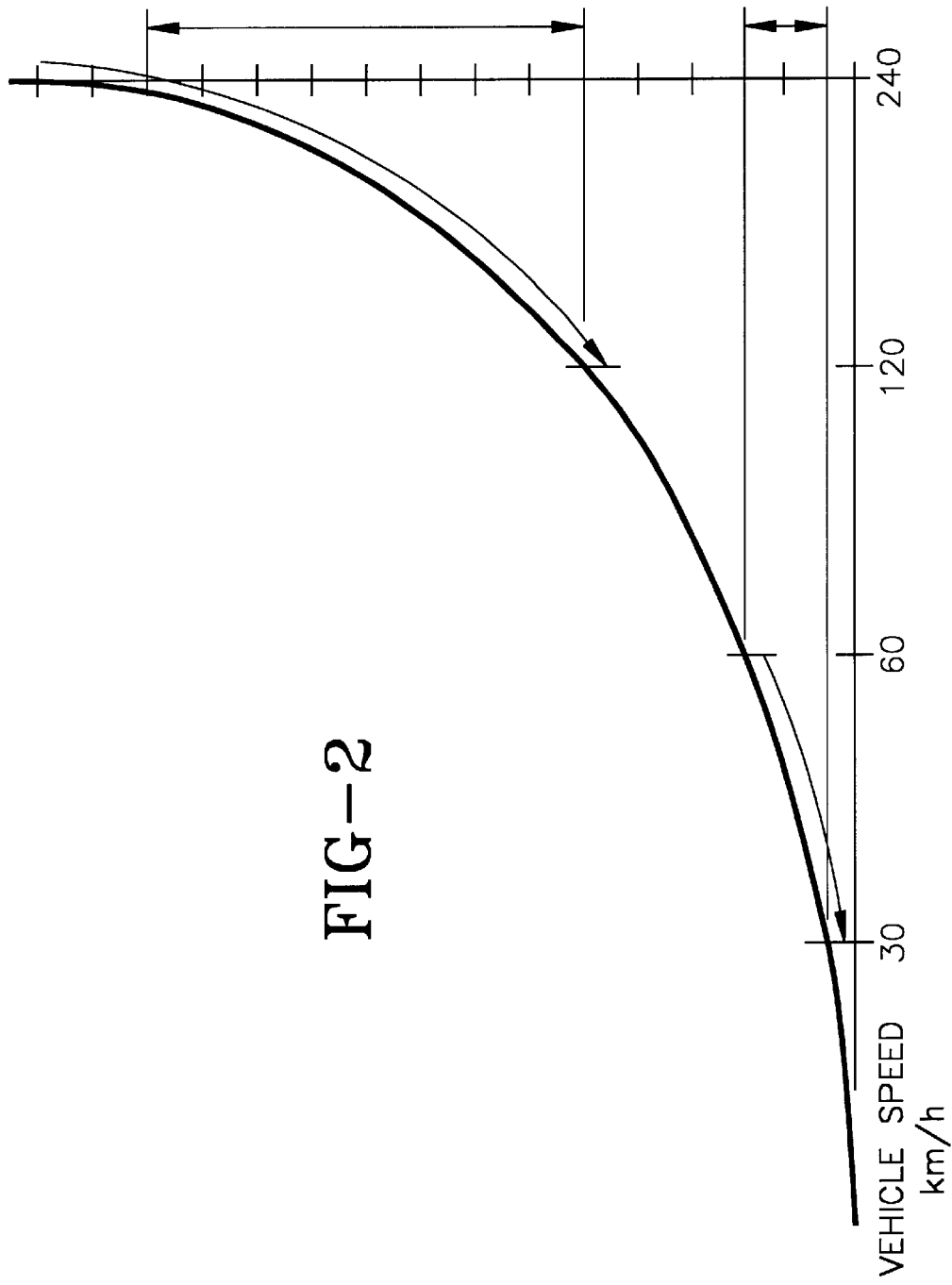
FIG. 2 is a graph showing the length of brake path or the corresponding period of time in dependence on the driving speed.

In addition, the threshold values can be adjusted with respect to the vehicle speed, which is measured by the speedometer 12. The threshold value for longitudinal acceleration or braking can be set in relation to the characteristics shown in FIG. 2, which represent the reaction time, stopping distance or the corresponding time in relation to speed.

Threshold values for yaw angle speed, yaw angle acceleration and lateral acceleration can be set in relation to the output signal of a steering angle sensor 10. Another sensor 13 detects the actual value of the motor torque and can be linked to the respective storage allocations of the threshold value storage device 5, such that an adjustment of the threshold values can be achieved even in relation to the actual motor torque.

The evaluating device 6 detects a potential crash situation with the help of various indicating signals, which indicate various vehicle dynamic conditions. This is the result of a comparison with assigned threshold values, which can be adjusted while taking into account the respective desired operating conditions, if necessary. If a potential crash situation is detected, the electrical tightening drive 3 is activated to tighten the seat belt 1. This can occur in dependence on the respective indicating signals, which lead to the detection of a potential crash situation via the various decision channels, with various pulling forces. Under excessive lateral forces (lateral acceleration), for instance, a relatively soft tightening profile can be chosen. This soft tightening profile can also be chosen for excessive yaw angle speed or yaw angle acceleration. A hard tightening profile with a higher pulling force can be set by the control device 8, when the other indicating signals are higher than the assigned threshold values.

It is preferred that the seat belt tightening drive 3 be reversibly operable, i.e. if no crash takes place, it can be brought back to its original position. The previously effective output pulling force thus acts upon the seat belt. The tightening drive can maintain the increased pulling force for a given period of time, e.g. 5 seconds. In a crash, an already increased pulling force acts upon the seat belt and the pulling force required for the crash situation can be reached within a short period of time. Further indicating signals, which for instance indicate an angular positioning of the vehicle and the danger of a rollover situation, can also be compared with corresponding threshold values in the evaluating device.

It is preferable that for the detection of a potential crash situation, specific indicating signals, as for instance driving speed, steering wheel angle, actual motor torque, are assessed to create a driving behaviour pattern for the driver, draw up specific threshold values for the indicating signals mentioned above or to modify the latter. When the actual operating behaviour of the motor vehicle as determined by the indicating signals does deviate from the determined behaviour pattern, the evaluating device detects a potential crash situation and the electrical tightening drive is triggered to tighten the seat belt.

While certain representative embodiments and details have been presented for the purpose of illustrating the invention, it will be apparent to those skilled in the art that various changes and modifications may be made therein without departing from the spirit and scope of the invention.

What is claimed is:

1. A seat belt tightener comprising
   an electrical tightening drive that can be operated in dependence on signals from an array of sensors which are assessed in an evaluating device, wherein the array of sensors comprises sensors that detect specific vehicle dynamic conditions and transmit indicating signals to the evaluating device,
   the evaluating device compares the received indicating signals with a respectively allocated threshold value to detect a potential crash situation and above a determined vehicle speed threshold, the evaluating device controls the electrical tightening drive when a potential crash situation has been detected, and
   specific indicator signals for adjusting the threshold values stored in a threshold value storage device, the specific indicator signals provide the evaluating device with data about a driving behaviour as desired by a driver.

2. The seat belt tightener according to claim 1 wherein the electrical tightening drive can be operated on different tightening levels in dependence on the indicating signals from which a potential crash situation is detected.

3. The seat belt tightener according to claim 1 wherein the array of sensors comprises sensors that emit signals to control driving stability.

4. The seat belt tightener according to claims 1 further comprising a pressure gradient computer connected to the array of sensors, said pressure gradient computer evaluates the brake pressure created by the brake pedal and emits a corresponding indicating signal to the evaluating device to compare it with a corresponding threshold value.

5. The seat belt tightener according to claim 4 wherein a comparison between the measured brake pressure and a brake pressure threshold value takes place in the evaluating device and the period of time that the threshold value exceeds the measured brake pressure is compared with a set period of time.

6. The seat belt tightener according to claim 4 wherein for the detection of the potential crash situation the measured brake pressure and the simultaneously assessed brake pressure gradient are evaluated.

7. The seat belt tightener according to claim 5 wherein for the detection of the potential crash situation the measured brake pressure and the simultaneously assessed brake pressure gradient are evaluated.

8. The seat belt tightener according to claim 1 wherein the evaluating device compares a lateral acceleration or lateral force, measured on the vehicle, with a corresponding threshold value.

9. The seat belt tightener according to claim 1 wherein the evaluating device compares a yaw moment measured on the vehicle with a corresponding threshold value.

10. The seat belt tightener according to claim 1 wherein the evaluating device compares a measured yaw angle speed of the vehicle with a corresponding threshold value.

11. The seat belt tightener according to claim 1 wherein the evaluating device compares a measured longitudinal acceleration or braking of the vehicle with a corresponding threshold value.

12. The seat belt tightener according to claims 1 wherein a threshold value storage device containing the threshold values is connected in the evaluating device with a sensor that senses the torque of a motor.

13. The seat belt tightener according to claim 1 wherein the electrical tightening drive is reversibly operable.

14. The seat belt tightener according to claim 1 wherein the pulling force generated by the electrical tightening drive is maintained for a specific period of time.

* * * * *